Jan. 10, 1939.  H. LEWY  2,143,782
SKIMMER
Filed Sept. 25, 1937
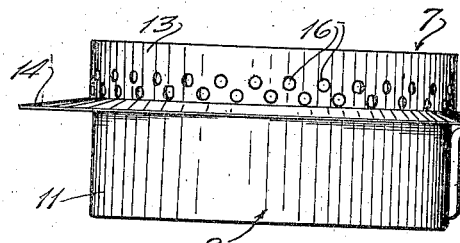
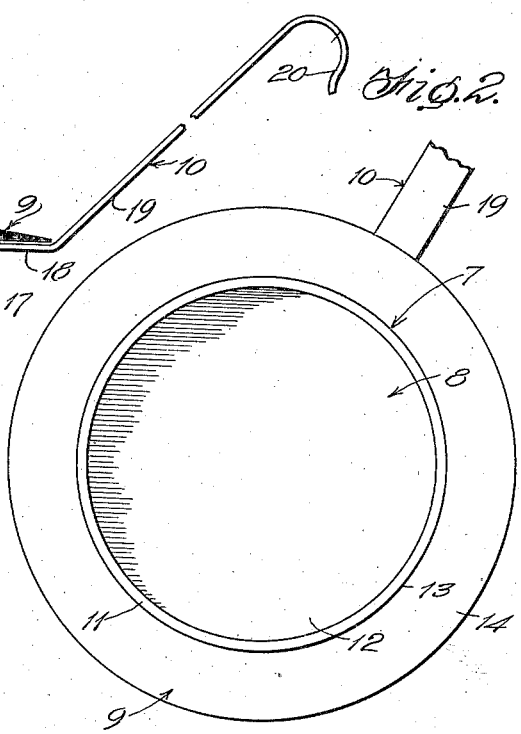
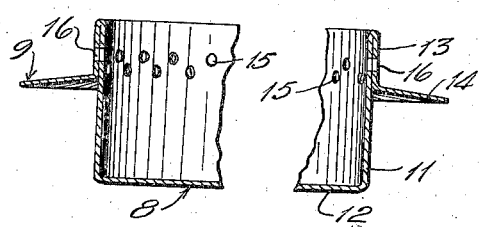
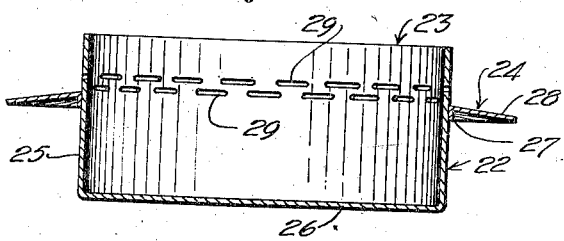
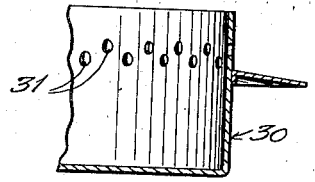
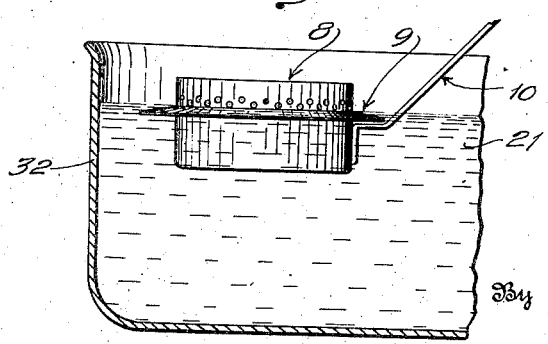
Inventor
HARRY LEWY,
By Kimmel & Crowell,
Attorneys Patented Jan. 10, 1939

2,143,782

UNITED STATES PATENT OFFICE 2,143,782

SKIMMER

Harry Lewy, Baltimore, Md.

Application September 25, 1937, Serial No. 165,752

5 Claims. (Cl. 65—28)

This invention relates to a culinary utensil, more particularly to a skimmer.

The invention has for its object to provide in a manner as hereinafter set forth, a skimmer so constructed for expeditiously and efficiently skimming off grease from the level of a body of soup.

A further object of the invention is to provide in a manner as hereinafter set forth, a culinary utensil of the type referred to with means to gauge its position relative to the matter which is to be skimmed off from a body of soup when it is desired to carry out the skimming operation.

A further object of the invention is to provide, in a manner as hereinafter set forth, a culinary utensil of the type referred to having a flat bottom and a gauge between the top and bottom and with the former providing for the utensil to be lowered close to the flat bottom of the soup kettle when the vessel contains a body of soup having its level at a point such as to extend just over the gauge of the utensil thereby enabling a small body of soup to be skimmed.

A further object of the invention is to provide, in a manner as hereinafter set forth, a culinary utensil of the type referred to including an open top and closed bottom grease collector provided between the top and bottom with a laterally disposed gauge and the body above the latter formed with intakes for the grease or skimmed off matter.

Further objects of the invention are to provide, in a manner as hereinafter set forth, a culinary utensil which is simple in its construction and arrangement, strong, durable, conveniently handled, compact, thoroughly efficient in its use, readily assembled, expeditious in its operation, and comparatively inexpensive to manufacture.

To the above ends essentially and to others which may hereinafter appear, the invention consists of the novel construction, combination and arrangement of parts as will be more specifically referred to and illustrated in the accompanying drawing wherein is shown embodiments of the invention, but it is to be understood that changes, variations and modifications may be resorted to which fall within the scope of the invention as claimed.

Although the invention is designed primarily for the skimming of grease from a body of soup, while hot, yet it is to be understood that a culinary utensil, in accordance with this invention is for use in any connection for which it may be found applicable.

In the drawing:

Figure 1 is a side elevation of the skimmer,

Figure 2 is a top plan view thereof,

Figure 3 is a vertical section broken away,

Figure 4 is a vertical sectional view of a modified form,

Figure 5 is a fragmentary view in vertical section of another modified form, and Figure 6 is a fragmentary view in vertical section of a soup kettle containing a body of soup and showing with respect to the latter the arrangement of the skimmer in its active position.

With reference to Figures 1, 2 and 3, the skimmer generally indicated at 7 includes a collector 8, a gauge 9 and a handle 10. The collector and gauge are stamped from a single length of suitable sheet metal.

The collector 8 includes an open top and closed bottom body part 11 of the desired contour and depth. Preferably body part 11 will be of annular form of any suitable diameter. The bottom of body part 11 is indicated at 12 and is flat. The gauge 9, as shown, is of annular form and of angle-shape cross section. The gauge 9 consists of an upstanding hanger 13 and a gauge member 14 extending outwardly from the lower end of hanger 13 at a slight downwardly inclination. The member 14 may be of any cross sectional length desired. The hanger 13 merges at its top edge with the top edge of body part 11. Preferably the height of the hanger 13 will be such that its lower end is positioned above the horizontal median of body part 11 and is so shown. The hanger 13 snugly encompasses the body part 11. The latter and hanger 13 are formed with registering openings 15, 16 respectively which provide intakes for the grease skimmed off from the soup. The openings are arranged in superposed circumferentially extending rows.

The handle 10 includes a vertically disposed inner part 17, a horizontal intermediate part 18 which extends outwardly at right angles to the upper end of part 17 and an outwardly extending upwardly inclined outer part 19 merging at its lower end with the outer end of part 18. The part 19 is of greater length than the other parts and has its upper terminal portion in the form of a hook 20. The part 17 of handle 10 is secured to the outer periphery of body part 11 below and in proximity to gauge member 14. The handle 10 is formed of suitable material of strap-like form of any desired width.

The gauge 9 enables the operator to observe and position the skimmer at the desired depth within the body of soup 21 and which is so that the member 14 will be disposed directly below the grease to be skimmed off whereby the matter skimmed off will contain but a very small quantity of the soup, if any.

With reference to Figure 4, the form of skimmer shown thereby is generally indicated at 22 and it is not formed from a single piece of sheet metal as the form shown in Figure 1. The skimmer 22 includes a collector 23 and a gauge 24. The collector comprises an open top and closed bottom body part 25. The gauge 24 encompasses and is arranged between the horizontal median and upper end of body part 25. The latter has a flat bottom 26. The gauge 24 is of angle shape in cross section and includes a vertically disposed part 27 and a horizontally disposed gauge member 28 extending outwardly at a slight downward inclination from the upper end of part 27. The latter is fixedly secured to the outer periphery of body part 25. The latter above the member 28 is formed with superposed rows of circumferentially disposed spaced slots 29 constituting grease intakes therefor. The skimmer 22 is to be provided with a handle not shown. With reference to Figure 5, the form of skimmer shown thereby is indicated at 30 and it is similar in construction to the skimmer 22 with this exception that the grease intakes are in the form of openings 31 in lieu of the slots 29.

A soup kettle is indicated at 32.

What I claim is:

1. A skimmer comprising an open top and closed bottom collector, a gauge member encompassing and extending laterally from the collector, a handle for the collector, said collector being provided circumferentially thereof with intake means above said member, said gauge member being disposed at a point between the horizontal median and open top of the collector.

2. A skimmer including sides and a closed bottom, with intakes through all the sides thereof entirely unobstructed laterally.

3. In a skimmer, a structure including an open top and a closed bottom collecting chamber provided with intakes adjacent the upper portion of the chamber, a handle secured to said skimmer at an oblique angle thereto, said intakes being on all sides of the chamber and entirely unobstructed laterally.

4. A skimmer including a closed bottom collector, a flange encompassing and extending laterally and downwardly from the collector and intake means above the flange through the collector walls.

5. A skimmer comprising an open top and closed bottom collector provided with a circumferentially extending row of spaced intakes, a gauge member disposed in circumferential lateral relation with respect to the collector and arranged below and in proximity to the said row of intakes, and a handle attached to the collector.

HARRY LEWY.